United States Patent
Yanke et al.

(10) Patent No.: US 10,299,434 B2
(45) Date of Patent: May 28, 2019

(54) FLOAT ARM SUPPORT

(71) Applicant: Deere and Company, Moline, IL (US)

(72) Inventors: Bryan R. Yanke, Eldridge, IA (US);
Duane M. Bomleny, Geneseo, IL (US);
Benjamin M. Lovett, Colona, IL (US);
Michael L. Vandeven, Princeton, IA (US); Eric D. Taflinger, Eldridge, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/663,668

(22) Filed: Jul. 28, 2017

(65) Prior Publication Data

US 2019/0029176 A1  Jan. 31, 2019

(51) Int. Cl.
| | |
|---|---|
| *A01D 43/06* | (2006.01) |
| *A01D 57/04* | (2006.01) |
| *A01D 34/22* | (2006.01) |
| *A01D 41/14* | (2006.01) |
| *A01D 57/20* | (2006.01) |
| *A01D 78/10* | (2006.01) |

(52) U.S. Cl.
CPC ............ *A01D 43/06* (2013.01); *A01D 34/22* (2013.01); *A01D 41/14* (2013.01); *A01D 57/04* (2013.01); *A01D 41/148* (2013.01); *A01D 57/20* (2013.01); *A01D 78/1028* (2013.01)

(58) Field of Classification Search
CPC .. A01D 41/141; A01D 41/148; A01D 41/145; A01D 84/00; A01D 41/14; A01D 57/20; A01D 89/003

USPC ........................................................ 56/208
See application file for complete search history.

(56) References Cited

U.S. PATENT DOCUMENTS

| | | | | |
|---|---|---|---|---|
| 3,871,161 | A | * 3/1975 | Eisenhardt ............ | A01D 23/02 56/121.46 |
| 3,925,971 | A | 12/1975 | Goering et al. | |
| 4,315,395 | A | * 2/1982 | Randall .................. | A01D 41/14 280/765.1 |
| 4,441,307 | A | * 4/1984 | Enzmann ................ | A01D 41/14 56/10.2 R |
| 4,573,308 | A | * 3/1986 | Ehrecke ................. | A01D 41/14 56/14.4 |

(Continued)

FOREIGN PATENT DOCUMENTS

| | | |
|---|---|---|
| BE | 752587 | 12/1970 |
| DE | 2460106 | 9/1975 |

(Continued)

OTHER PUBLICATIONS

EP Search Report for 18186037.0-1006 dated Jan. 10, 2019.

*Primary Examiner* — Arpad Fabian-Kovacs
(74) *Attorney, Agent, or Firm* — Rathe Lindenbaum LLP

(57) ABSTRACT

A float arm support system may include a float arm supporting an active member, the float arm being pivotable about a first axis, a skid shoe to bear against and follow local ground contours of the underlying terrain while supporting the active member of the float arm above the underlying terrain and a powered actuator. The skid shoe may be coupled to the float arm between the first axis and the active member. The powered actuator may be operably coupled to the skid shoe to vertically move the skid shoe to adjust a spacing at which the skid shoe supports the active member of the float arm relative to the underlying terrain.

15 Claims, 9 Drawing Sheets

(56) References Cited

U.S. PATENT DOCUMENTS

| | | | |
|---|---|---|---|
| 4,845,931 A * | 7/1989 | Bruner | A01D 41/141 |
| | | | 56/208 |
| 5,305,586 A * | 4/1994 | Lundahl | A01D 34/53 |
| | | | 56/14.4 |
| 6,289,659 B1 * | 9/2001 | Fox | A01D 46/08 |
| | | | 56/10.2 E |
| 6,883,299 B1 | 4/2005 | Gramm | |
| 7,310,931 B2 | 12/2007 | Gramm | |
| 7,730,700 B2 | 6/2010 | Nathan et al. | |
| 7,937,920 B2 | 5/2011 | Schmidt et al. | |
| 8,230,670 B2 | 7/2012 | Schmidt et al. | |
| 9,538,709 B2 * | 1/2017 | Bassett | A01D 57/20 |
| 9,775,291 B2 * | 10/2017 | Neudorf | A01D 41/145 |
| 2006/0242935 A1 * | 11/2006 | Rayfield | A01D 41/141 |
| | | | 56/10.2 E |
| 2009/0241503 A1 * | 10/2009 | Babler | A01D 84/00 |
| | | | 56/366 |
| 2010/0037584 A1 * | 2/2010 | Dow | A01B 73/02 |
| | | | 56/376 |
| 2013/0014481 A1 * | 1/2013 | Dow | A01B 73/00 |
| | | | 56/13.5 |
| 2015/0033692 A1 * | 2/2015 | Schroeder | A01D 34/008 |
| | | | 56/10.2 E |
| 2015/0101300 A1 | 4/2015 | Pierson | |
| 2015/0282426 A1 * | 10/2015 | Gantzer | A01D 57/28 |
| | | | 56/376 |
| 2016/0044868 A1 * | 2/2016 | Bassett | A01D 57/20 |
| | | | 56/376 |
| 2016/0360703 A1 * | 12/2016 | Leiston | A01D 89/002 |
| 2017/0303471 A1 * | 10/2017 | Williams | A01D 87/02 |

FOREIGN PATENT DOCUMENTS

| | | |
|---|---|---|
| EP | 0048127 | 3/1982 |
| EP | 0540881 | 5/1993 |
| EP | 2984921 | 2/2016 |
| FR | 1219767 | 5/1960 |

* cited by examiner

FLOAT ARM SUPPORT

BACKGROUND

Many machines or implements have active members that interact with plants, such as grass or various crops. Such machines or implements pivotably support float arms or other support assemblies that support the active members above the underlying terrain. For example, many agricultural machines, such as combine harvesters and hay mowing machines include float arms or other support assemblies that support an active member, in the form of a cutter bar and reciprocating knife, above the underlying terrain as the reciprocating knife severs and separates crops from their growing medium.

Figure 1:
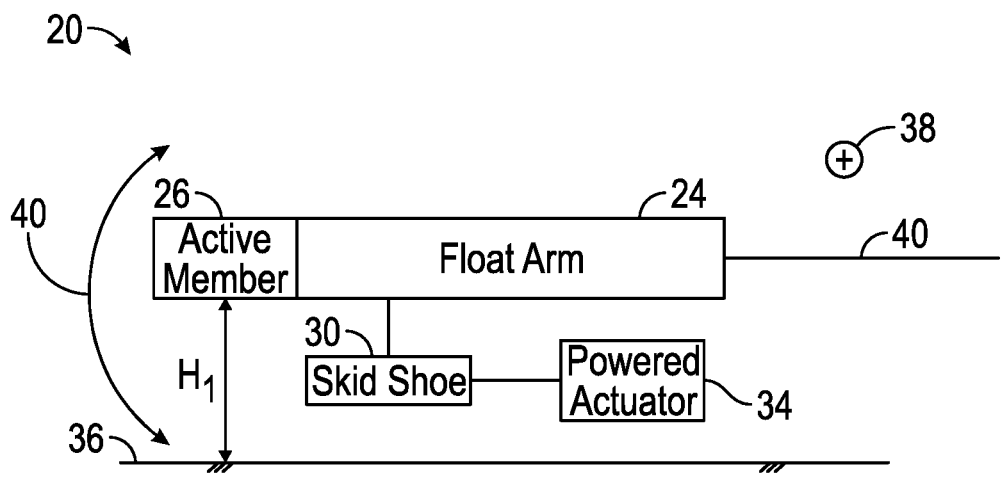
FIG. 1 is a side view schematically illustrating portions of an example float arm support system supporting an active member at a first height.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Many machines, such as combine harvesters, maintain a selected height of a harvester head with respect to the underlying terrain by sensing the ground with gage wheels behind the head or downwardly extending sensor canes beneath the frame of the head which is cantilered from the feederhouse. Based upon the sensed height of the head, the head is then pivoted to follow the ground by hydraulic actuators connected between the harvester and rear portions of the pivotably supported head.

Disclosed herein are example float arm support systems, methods and harvester heads that provide enhanced head height control and enhanced ground following. Disclosed herein are example float arm support systems, methods and harvester heads that utilize skid shoes that are selectively raised and lowered using a remote controlled powered actuator to control a height of the head and the active member (cutter bar) relative to the underlying terrain, wherein the skid shoes directly translate changes in the underlying terrain to changes in the angular positioning or orientation of the head to better maintain the height of the head and active member relative to the underlying terrain.

Disclosed herein are example float arm support systems that utilize skid shoes that are movable relative to a cutter bar or main frame of a harvester head to enable height adjustment of a knife position of the cutter bar, wherein the skid shoes act as positioning control for the knives. Disclosed herein are example float arm support systems that utilize skid shoes, the positioning of which is remotely controllable through the use of powered actuators and a controller. Disclosed herein are example float arm support systems that as the target height for the active member or target cutting height for the knife of the cutter bar is reduced, the positioning of the skid shoes moves closer to the cutter bar and closer to the knives to provide for quicker reactions to changes in the ground adjacent the active member or adjacent the cutter bar and its knives.

Disclosed herein is an example float arm support system that may include a float arm supporting an active member, the float arm being pivotable about a first axis, a skid shoe to bear against and follow local ground contours of the underlying terrain while supporting the active member of the float arm above the underlying terrain and a powered actuator. The skid shoe may be coupled to the float arm between the first axis and the active member. The powered actuator may be operably coupled to the skid shoe to vertically move the skid shoe to adjust a spacing at which the skid shoe supports the active member of the float arm relative to the underlying terrain.

Disclosed herein is an example method which comprises movably supporting a float arm carrying an active member about a first axis and increasing a spacing between the float arm relative to underlying terrain by vertically lowering a skid shoe carried by the float arm with a powered actuator.

Disclosed herein is an example harvester head that may comprise a support assembly supporting a cutter bar, a skid shoe to bear against and follow local ground contours of the underlying terrain while supporting the cutter bar above the underlying terrain and a powered actuator. The skid shoe may be being pivotably coupled to the frame about a second axis parallel to the first axis between the first axis and the cutter bar. The powered actuator is operably coupled to the skid shoe to selectively pivot the skid shoe about the second axis to adjust a spacing at which the skid shoe supports the cutter bar relative to the underlying terrain.

FIG. 1 is a schematic diagram illustrating portions of an example float arm support system 20. FIG. 1 illustrates float arm support system 20 in a first vertical state in which an active member is supported at a height H1 above an underlying terrain 36. Float arm support system 20 provides enhanced height control or ground following performance for an active member. Float arm support system 20 comprises a float assembly in the form of a float arm 24, active member 26, skid shoe 30 and powered actuator 34.

Float arm 24 comprises one or more interconnected structures that movably support active member 26 in a vertical direction above and relative to the underlying terrain 36. In one implementation, float arm 24 pivots about a substantially horizontal axis 38 in the directions indicated by arrows 40. In one implementation in which float arm 24 is supported by a feeder house of a combine harvester, float arm 24 is pivotable about a horizontal pivot axis 38 at the junction of the feeder house in the harvester head that supports float arm 24. In some implementations, float arm 24 may additionally or alternatively pivot about a horizontal axis 40 that is generally parallel to the length of float arm 24. For example, in one implementation in which float arm 24 is part of a wing of a harvester head, float arm 24 may additionally or alternatively pivot about an axis 40 that pivotally connects the wing to a central portion of the harvester head.

Active member 26 comprises a member or mechanism that interacts with plants or other objects extending from or above the underlying terrain 36. In one implementation, active member 26 comprises a cutter bar and a reciprocatively supported knife. During use the system 20, active member 26 may be supported at various heights relative to the underlying terrain 36, depending upon characteristics of the crop being harvested or otherwise interacted upon.

Skid shoe 30 comprises a member that is coupled to float arm 24, or the other structures forming the support assembly that pivot about axis 38 and/or axis 40. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Skid shoe 30 spaces float arm 24 and active member 26 at a selected height above the underlying terrain. Skid shoe 30 skids or rides along the surface of the underlying terrain 36, the ground. As a result, when encountering a bump or rise in the underlying terrain 36, skid shoe 30 rides up the bumps or rise in terrain and elevates float arm 24 and active member 26 above the bump or rise by pivoting float arm 24 about axis 38 and/or axis 40. When encountering a depression in the underlying terrain 36, scheduled 30 rides down the depression and lowers float arm 24 and active member 26. Skid shoes 30 automatically translate changes in the topography of the surface of the underlying terrain 36 to changes in positioning of float arm 24 and active member 26.

Powered actuator 34 comprises a mechanism operably coupled to skid shoe 30 to selectively raise and lower skid shoe 30, changing the vertical space between the bottom of skid shoes 30 and float arm 24. Powered actuator 34 adjusts the positioning of skid shoe 30 in response to control signals received from a remote controller, controller that is remote or spaced from the head or other structure including float arm 24. The positioning of skid youth 30 controls the constant spacing that is to be maintained between active member 26 and the underlying terrain 36. In one implementation, the remote controller may be located in a cab of a combine harvester. In another implementation, remote controller maybe located at a separate site, remote from the harvester that incorporates float arm 24 and powered actuator 34.

In one implementation, powered actuator 34 comprises a hydraulic cylinder-piston assembly operably coupled between float arm 24 and skid shoe 30. In one implementation, skid shoe 30 maybe operably coupled to float arm 24 by one or more linkages, wherein extension or retraction of the rod/piston of the hydraulic cylinder-piston assembly reposition such linkages so as to extend or retract skid shoe 30 relative to float arm 24. In another implementation, skid shoes 30 is operably coupled to float arm 24 comprises a scissor jack, wherein powered actuator 34 comprises a hydraulic cylinder-piston assembly that actuates the scissor jack extend or retract skid shoe 30 relative to float arm 24. In one implementation, powered actuator 34 may comprise other forms of a powered actuator such as electric solenoid, electric actuator or motor, hydraulic motor, pneumatic actuator or motor, or an internal combustion engine, wherein each is operably coupled to skid shoe 30 so as to drive skid shoe 30 or the mechanism coupling skid shoe 30 to float arm 24 to extend or retract skid shoe 30.

Figure 2:
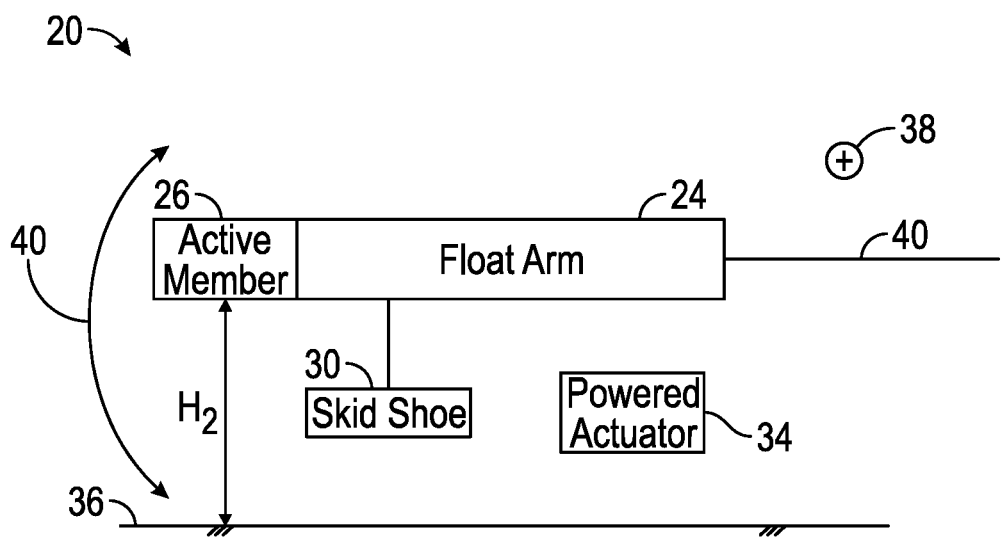
FIG. 2 is a side view schematically illustrating portions of the example float arm support system of FIG. 1 while supporting the active member at a second height.

FIG. 2 illustrates float arm support system 20 following the repositioning of skid shoe 30 by powered actuator 34. 2 illustrates active member 26 supported at a height H2 above the underlying terrain 36, wherein height H2 is greater than H1 (shown in FIG. 1). Such height adjustment may be initiated by a remote operator when the active member 26 is to interact with portions of plants or other objects at the greater height H2. During such height adjustment, powered actuator extends skid shoe 30 from float arm 24 such that skid shoe 30 engages terrain 36, resulting in float arm 24 being pivoted about axis 38 and/or axis 40. While skid shoe 30 is at the selected spacing with respect to float arm 24 as provided by powered actuator 34, float arm 24 and active member 26 continue to pivot about axis 38 and/or axis 40 in response to bumps or temporary rises in terrain 36 when traversing terrain 36.

Figure 3:
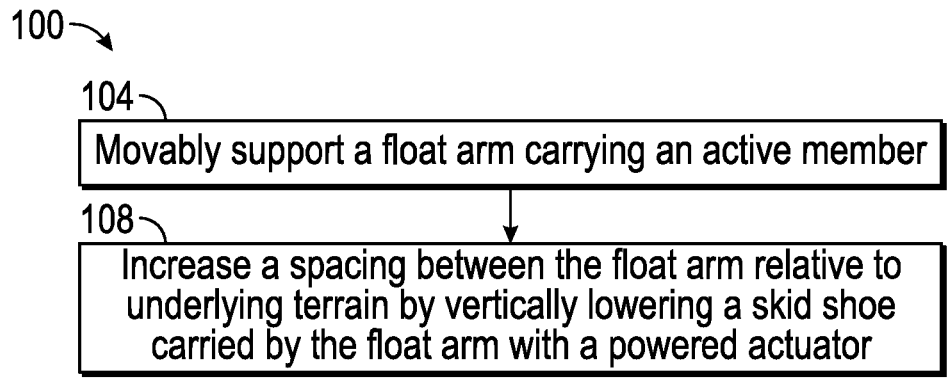
FIG. 3 is a flow diagram of an example method or positioning an active member relative to an underlying terrain with a powered actuator.

FIG. 3 is a flow diagram of an example method 100 for active member to ground height control or active member ground following. Method 100 provides enhanced control over the relative positioning between and active member and the underlying ground terrain. Although method 100 is described in the context of being carried out with system 20, it should be appreciated that method 100 may also be carried out with any of the systems described in this disclosure or other similar systems.

As indicated by block 104, float arm 24 is movably supported and carries an active member 26. As indicated by block 108, the vertical spacing between the float arm 24 (and active member 26) relative to the underlying terrain 36 is increased by vertically lowering/extending a skid shoe 30, carried by the float arm 24, with a powered actuator 34. Conversely, the vertical spacing between the float arm 24 (and active member 26) relative to the underlying terrain 36 may be reduced by vertically raising/retracting the skid shoe 30, carried by the float arm 24, with a powered actuator 24.

Figure 4:
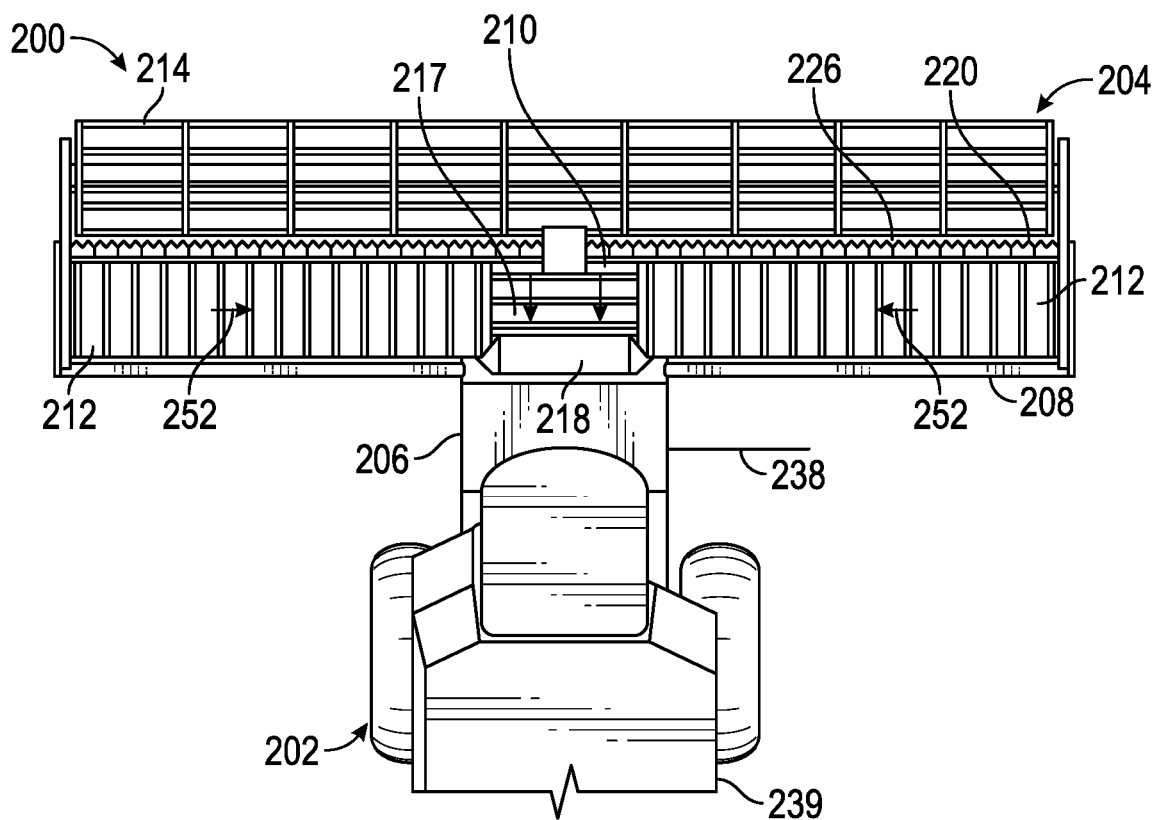
FIG. 4 is a fragmentary top view illustrating portions of an example harvester with an example harvester head.
Figure 5:
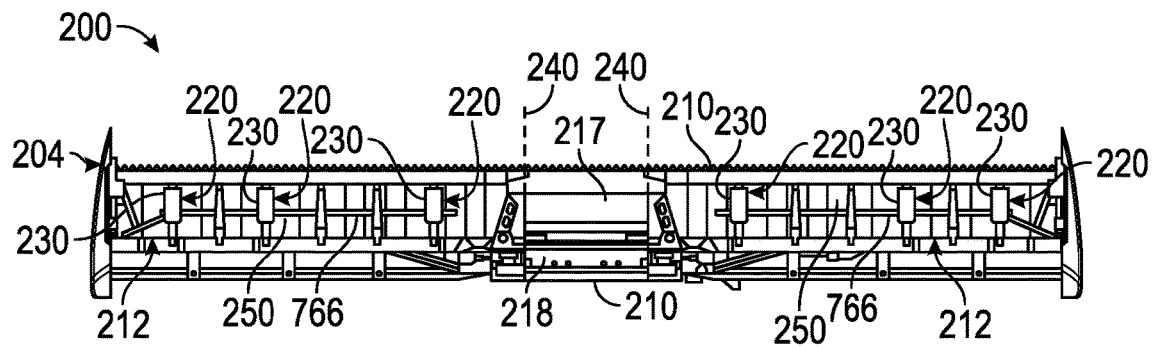
FIG. 5 is a bottom view of portions of the harvester head of the harvester of FIG. 4.
Figure 6:
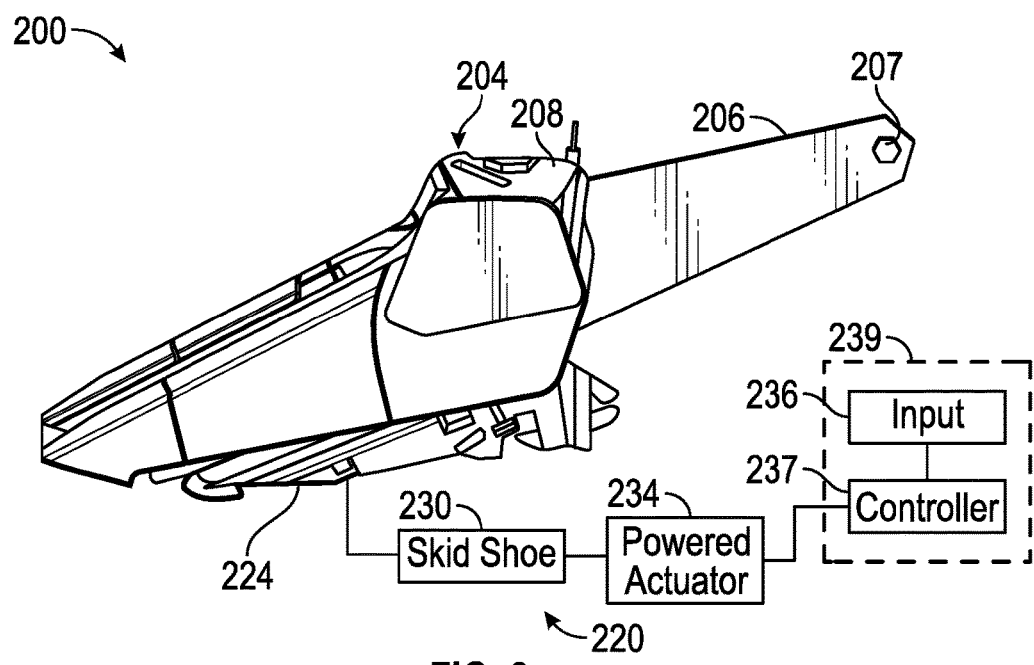
FIG. 6 is a side view of the harvester head of the harvester of FIG. 4 with portions schematically illustrated.

FIGS. 4-6 illustrate portions of an example harvester 200 incorporating at least one example float arm support system 220. As shown by FIG. 4, harvester 200 comprises a main drive unit 202 and a removable head or head 204. Main drive unit 202 supports head 204 and moves or carries head 204 across a field during harvesting. Main drive unit 202 comprises a feeder or feeder housing 206 which pivots about a pivot axis 238 at one end and which is removably connected to head 204 at the other end. The feeder housing 206 conveys crops gathered by head 204 to internal mechanisms within main unit 202 which further separate and clean selected portions of the crop, such as grain, from the accompanying biomass material, such as husk, chaff and the like. In one such implementation, main drive unit 202 includes straw walkers or a rotary threshing mechanism with rearwardly located chafers or sieves for separating out grain. In one implementation, the cleaned crop or grain is conveyed to a holding tank for subsequent discharge. In some implementations, the non-grain portions or biomass are discharged at a rear of the harvester 200.

As shown by FIGS. 4-6, the example head 204 generally comprises main frame 208, center feed section 210, platform wings 212, gathering reels 214 and float arm support system 220. Main frame 208 supports center section 210 and platform wings 212. Main frame 208 connects to feeder house 206. Center feed section 210 extends from main frame 208 and comprises a central draper 217 and a feed drum 218. Central draper 216 conveys the crop received from wings 212 rearwardly towards feed drum 218 and feeder house 206.

Wings 212 extend on either side of center feed section 210 and pivot relative to center feed section 210 about axes 240. Each of wings 212 comprises a framework that movably supports a draper 250. Drapers 250 comprise carpets, platforms or belts which are transversely driven as indicated by arrows 252 so as to carry the severed plants or crops to central draper 216.

Gathering reels 214 are rotatably supported across the front of head 204. Gathering reels 214 are rotatably driven to direct the crop towards cutter assembly 216. In some implementations, gathering reels 214 are segmented, wherein the different segments may pivot relative to one another when accommodating terrain changes.

Float arm support system 220 is shown in FIGS. 5 and 6. Float arm support system 220 comprises a series of spaced float arms 224 (one of which is shown in FIG. 6), an active member in the form of a cutter assembly 226, skid shoes 230 (schematically shown in FIG. 6), at least one powered actuator 234, an input 236 and a controller 237. Float arms 224 comprise bars, arms or other structural members that correspond in location to each of skid shoes 230 and that extend from the framework of sections 212 to the front of sections 212, where such float arms 224 support, in a cantilevered fashion, the cutter assembly 226.

Cutter assembly 226 cuts and/or severs the crop or plant from soil. In one implementation, cutter assembly 226 comprises an elongate flexible cutter bar supporting guides that guide movement of a reciprocatively driven knife. In one implementation, cutter assembly 226 continually extends across an entire front of head 204. In other implementations, cutter assembly 226 may be provided by different sections along the front of head 204.

Skid shoes 230 are similar to skid shoes 30 described above. Each of skid shoes 230 comprises a plate having a face or multiple faces that oppose the underlying ground terrain and that bear against the topography of the underlying ground terrain as head 204 is carried across a field. Skid shoes 230 space their respective float arms 24 and portions of cutter assembly 226 at a selected height above the underlying terrain. Each skid shoe 230 skids or rides along the surface of the underlying terrain, the ground. As a result, when encountering a bump or rise in the underlying terrain, the skid shoe 230 opposite to the bump or rise rides up the bumps or rise and elevates its respective float arm 224 and portions of cutter assembly 226 above the bump or rise by pivoting the respective section 212 about axes 238 and 240.

Skid shoes 30 automatically translate changes in the topography of the surface of the underlying terrain to changes in positioning of float arms 24 and cutter assembly 226.

Powered actuators 234 are each similar to powered actuator 34 described above. Powered actuators 234 each comprise a mechanism operably coupled to a respective skid shoe 230 to selectively raise and lower the respective skid shoe 230, changing the vertical space between the bottom of the respective skid shoe 230 and the respective float arm 224. Powered actuator 234 adjusts the positioning of skid shoe 230 in response to control signals received from a remote controller 237.

In one implementation, powered actuator 234 comprises a hydraulic cylinder-piston assembly operably coupled between float arm 224 and skid shoe 230. In one implementation, skid shoe 230 may be operably coupled to float arm 224 by one or more linkages, wherein extension or retraction of the rod/piston of the hydraulic cylinder-piston assembly reposition such linkages so as to extend or retract skid shoe 230 relative to float arm 224. In another implementation, skid shoe 230 is operably coupled to float arm 224 and comprises a scissor jack, wherein powered actuator 234 comprises a hydraulic cylinder-piston assembly that actuates the scissor jack to extend or retract skid shoe 230 relative to float arm 224. In one implementation, powered actuator 234 may comprise other forms of a powered actuator such as electric solenoid, the motor or an internal combustion engine, wherein each is operably coupled to skid shoe 230 so as to drive skid shoe 230 or the mechanism coupling skid shoe 230 to float arm 224 to extend or retract skid shoe 230.

Input 236 comprise a device by which instructions, commands or settings may be provided to controller 237 for selection of a head height for a cutter bar to ground height setting. Input 236 may comprise a touchscreen, a pushbutton, a toggle switch, a slider bar, a microphone with associated each recognition software are various other structures by which a person may enter a height selection.

Controller 237 comprises a processor that may comprise a hardware architecture to retrieve executable code from the data storage device in the form of a non-transitory computer-readable medium and execute the executable code or instructions. The processor 142 can include a number of processor cores, an application specific integrated circuit (ASIC), field programmable gate array (FPGA) or other hardware structure to perform the functions disclosed herein. The executable code may, when executed by the processor, cause the processor to implement at least the functionality of powered actuator 234 based upon height settings received through input 236 such as disclosed herein. In the course of executing code, the processor may receive input from and provide output to a number of other hardware components, directly or indirectly.

In the example illustrated, controller 237 is remote or spaced from head 204. In one implementation, the remote controller 237 may be located in a cab 239 (also shown in FIG. 4) of the harvester 200. In another implementation, remote controller 237 may be located at a separate site, remote from the harvester 200.

Figure 7:
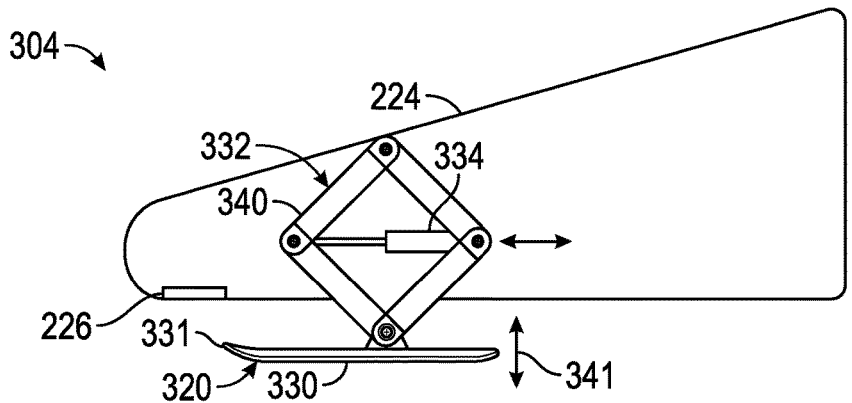
FIG. 7 is a side view of an example float arm support system for use in the example harvester of FIG. 4.

FIG. 7 is a diagram schematically illustrating portions of an example harvester head 304. Harvester head 304 may be utilized as part of harvester 200 in place of harvester head 204. Harvester head 304 is similar to harvester head 204 except that harvester head 304 comprises float arm support system 320 in place of float arm support system 220. Those remaining components of head 304 which correspond to components of head 204 are numbered similarly or are shown in FIGS. 4-5.

Float arm support system 320 comprises float arm 224, an active member in the form of cutter assembly 226, skid shoe 330, scissor jack 332 and powered actuator 334. Float arm 224 and cutter assembly 226 are described above. Skid shoe 330 is similar to skid shoe 30 or skid shoe 230 described above except that skid shoe 330 is specifically illustrated as having an upturned forward portion 331, providing smooth lower transition surface for riding up on any bumps or down any can cavities in the topography of the underlying terrain. Skid shoe 330 is pivotally connected to scissor jack 332.

Scissor jack 332 operably couples skid shoe 330 to float arm 224. Scissor jack 332 comprises four linkages 340 pivotably pinned to one another in the general shape of a rhombus. The pivotal connection between two of such linkages is pivotally coupled or connected to skid shoe 330 and wherein the pivotal connection between the opposite two of such linkages is pivotally coupled to float arm 224.

Powered actuator 334 comprises an actuator that, in response to signals from controller 237 (shown in FIG. 6), selectively moves or drives scissor jack 332 to selectively extend and retract skid shoe 330 relative to float arm 224 in the direction indicated by arrows 341. In the example illustrated, powered actuator 334 comprises a cylinder-piston assembly, such as a hydraulic cylinder-piston assembly, wherein a first end of the cylinder-piston assembly is pivotably connected to float arm 224 (or one of the linkages 340 of scissor jack 332) and a second end of the cylinder-piston assembly is pivotally connected to one of the linkages 340 of scissor jack 332. In other implementations, powered actuator 334 may comprise other actuators that are driven under power from a hydraulic pressure source such as a driven pump, a motor driven with electrical current, an electric solenoid, or a transmission driven by an internal combustion engine.

Figure 8:
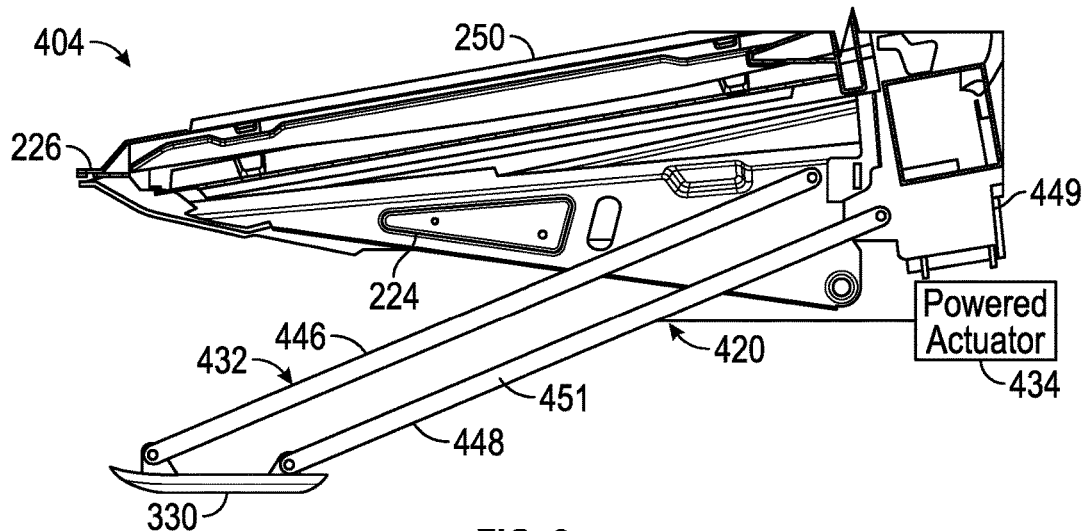
FIG. 8 is a side view of an example float arm support system for use in the example harvester of FIG. 4.

FIG. 8 is a diagram schematically illustrating portions of an example harvester head 404. Harvester head 404 may be utilized as part of harvester 200 in place of harvester head 204. Harvester head 404 is similar to harvester head 204 except that harvester head 404 comprises float arm support system 420 in place of float arm support system 220. Those remaining components of head 404 which correspond to components of head 204 are numbered similarly or are shown in FIGS. 4-5.

Float arm support system 420 comprises float arm 224, an active member in the form of cutter assembly 226, skid shoe 330, linkage assembly 432 and powered actuator 434. Float arm 224, cutter assembly 226 and skid shoe 330 are described above.

Linkage assembly 432 operably couples skid shoe 330 to float arm 224. Linkage assembly 432 comprises front linkage 446 and rear linkage 448. Front linkage 446 has a first end pivotally connected to a forward portion of skid shoe 330 and a second end pivotally connected to float arm 224. Rear linkage 448 has a first end pivotally connected to a rear portion of skid shoe 330 and a second portion pivotally connected to the rear framework 449 supporting float arm 224. Linkages 446 and 448 extend forwardly with respect to float arm 224 such that as skid shoe 330 is moved to a retracted position, closer to float arm 224, skid shoe 330 moves in a concurrently forward and upward direction into closer proximity with cutter assembly 226. In other words, as cutter assembly 226 is positioned closer to the underlying ground terrain, skid shoe 330 is also positioned closer to cutter assembly 226 to provide quicker response to changes in the underlying terrain proximate to and directly below cutter assembly 226. Said another way, when the skid shoe 330 is moving upward and forward, the ground contact point is getting closer to the actual cutting mechanism—so the cutting mechanism has a high degree of fidelity to follow the ground when the target cutting height is small.

Powered actuator 434 comprises an actuator that, in response to signals from controller 237 (shown in FIG. 6) selectively moves or drives linkage assembly 432 to selectively extend and retract skid shoe 330 relative to float arm 224. In the example illustrated, powered actuator 434 comprises a cylinder-piston assembly, such as a hydraulic cylinder-piston assembly, wherein a first end of the cylinder-piston assembly is pivotably connected to a central portion or midportion 451 between the ends of linkage 448 and a second end of the cylinder-piston assembly is pivotally connected to either float arm 224 or the rear supporting framework 449. In other implementations, powered actuator 434 may alternatively be connected to linkage 446. In other implementations, powered actuator 434 may comprise other actuators that are driven under power from a hydraulic pressure source such as a driven pump, a motor driven with electrical current, an electric solenoid, or a transmission driven by an internal combustion engine.

Figure 9:
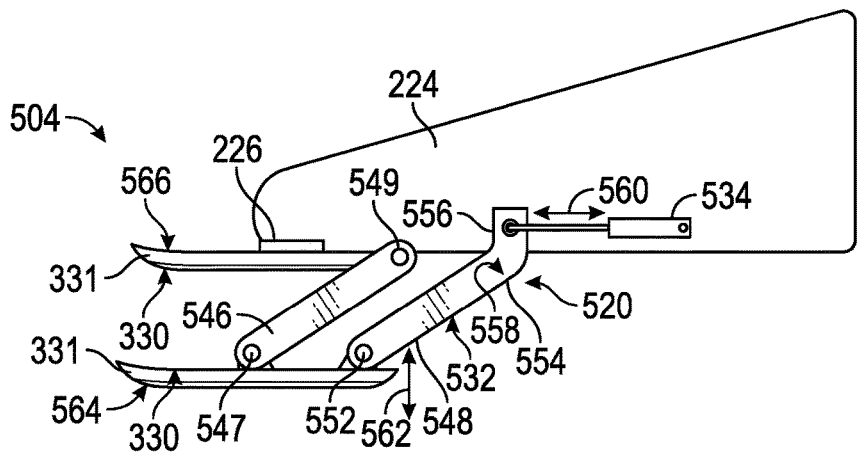
FIG. 9 is a side view of an example float arm support system for use in the example harvester of FIG. 4.

FIG. 9 is a diagram schematically illustrating portions of an example harvester head 504. Harvester head 504 may be utilized as part of harvester 200 in place of harvester head 204. Harvester head 504 is similar to harvester head 204 except that harvester head 504 comprises float arm support system 520 in place of float arm support system 220. Those remaining components of head 504 which correspond to components of head 204 are numbered similarly or are shown in FIGS. 4-5.

Float arm support system 520 comprises float arm 224, an active member in the form of cutter assembly 226, skid shoe 330, linkage assembly 532 and powered actuator 534. Float arm 224, cutter assembly 226 and skid shoe 330 are described above.

Linkage assembly 532 operably couples skid shoe 330 to float arm 224. Linkage assembly 532 comprises front linkage 546 and rear linkage 548. Front linkage 546 has a first end pivotally connected at pivot axis 547 to a forward portion of skid shoe 330 and a second end pivotally connected at pivot axis 549 to float arm 224. Rear linkage 548 has a first portion 552 pivotally connected to a rear portion of skid shoe 330, a second portion 554 pivotally connected to float arm 224 and a third portion 556 which serves as a lever arm for pivoting linkage 548 about pivot axis 558. Linkages 546 and 548 extend forwardly with respect to float arm 224 such that as skid shoe 330 is moved to a retracted position, closer to float arm 224, skid shoe 330 moves in a concurrently forward and upward direction into closer proximity with cutter assembly 226. In other words, as cutter assembly 226 is positioned closer to the underlying ground terrain, skid shoe 330 is also positioned closer to cutter assembly 226 to provide quicker response to changes in the underlying terrain proximate to and directly below cutter assembly 226.

Powered actuator 534 comprises an actuator that, in response to signals from controller 237 (shown in FIG. 6) selectively moves or drives linkage assembly 532 to selectively extend and retract skid shoe 330 relative to float arm 224. In the example illustrated, powered actuator 534 comprises a cylinder-piston assembly, such as a hydraulic cylinder-piston assembly, wherein a first end of the cylinder-piston assembly is pivotably connected to float arm 224 and a second end of the cylinder-piston assembly is pivotally connected the lever arm portion 548 of linkage 548. Extension or retraction of the cylinder-piston assembly forming actuator 534 in the direction indicated by arrows 560 pivots linkages 546, 548 to extend or retract skid shoe 330 in directions indicated by arrows 562 between the illustrated lower position 564 and the partially illustrated raised position 566. In other implementations, powered actuator 534 may alternatively be connected to a lever arm portion of linkage 546. In other implementations, powered actuator 534 may comprise other actuators that are driven under power from a hydraulic pressure source such as a driven pump, a motor driven with electrical current, an electric solenoid, or a transmission driven by an internal combustion engine.

Figure 10:
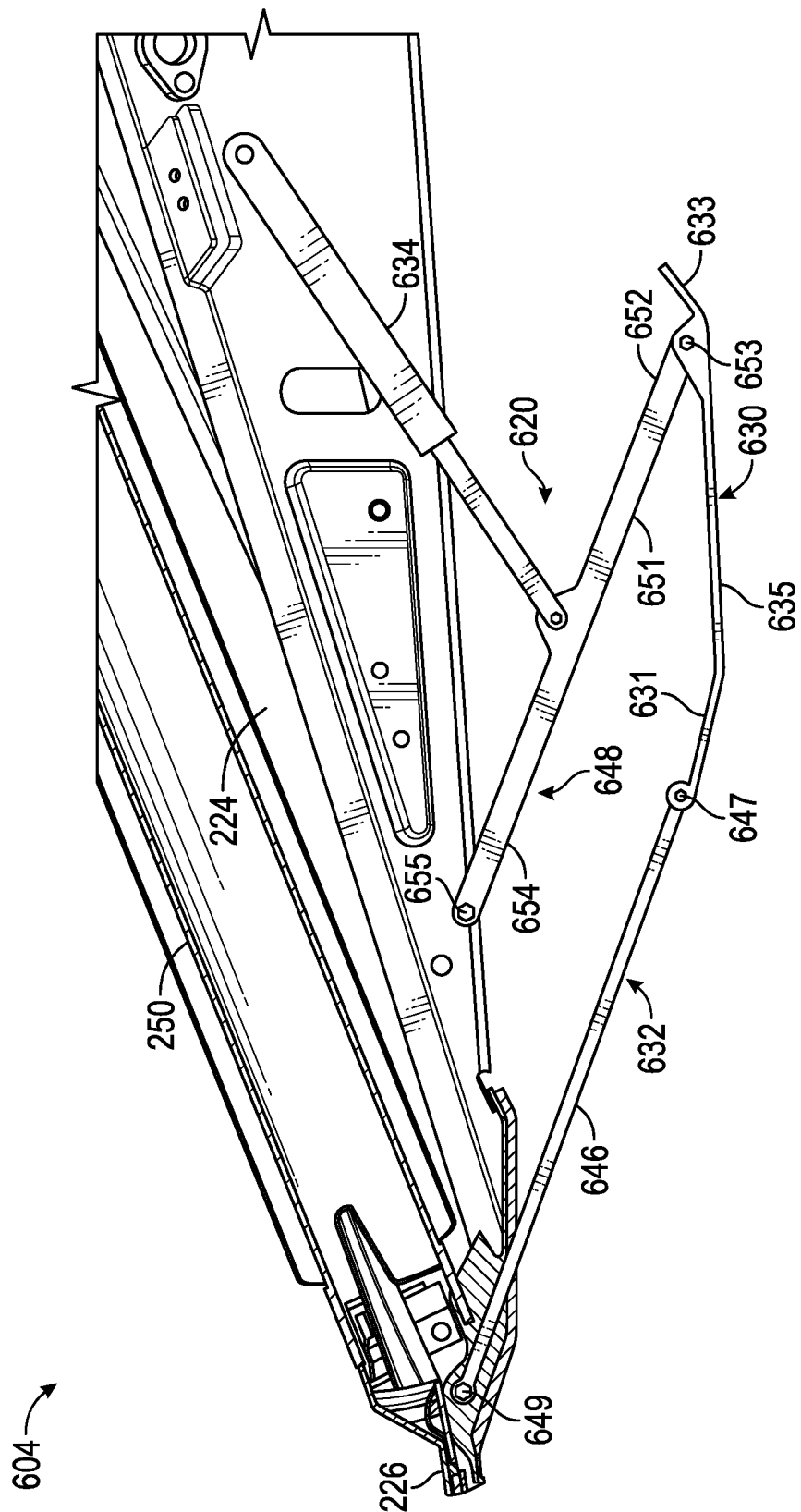
FIG. 10 is a side view of an example float arm support system for use in the example harvester of FIG. 4.

FIG. 10 is a diagram schematically illustrating portions of an example harvester head 604. Harvester head 604 may be utilized as part of harvester 200 in place of harvester head 204. Harvester head 604 is similar to harvester head 204 except that harvester head 604 comprises float arm support system 620 in place of float arm support system 220. Those remaining components of head 604 which correspond to components of head 204 are numbered similarly or are shown in FIGS. 4-5.

Float arm support system 620 comprises float arm 224, an active member in the form of cutter assembly 226, skid shoe 630, linkage assembly 632 and powered actuator 634. Float arm 224 and cutter assembly 226 are described above.

Skid shoe 630 is similar to skid shoe 30 or skid shoe 230 described above except that skid shoe 630 is specifically illustrated as having an upturned forward portion 631 and an upturned rearward portion 633 on opposite sides of the central flat portion 635, providing a smooth lower transition surface forward and rearward movement of skid shoes 630 along the ground when being adjusted by powered actuator 634 and for riding up on any bumps or down any can cavities in the topography of the underlying terrain. Skid shoe 330 is pivotally connected to powered actuator 634.

Linkage assembly 632 operably couples skid shoe 630 to float arm 224. Linkage assembly 632 comprises front linkage 646 and rear linkage 648. Front linkage 646 has a first end pivotally connected at pivot axis 647 to a forward portion of skid shoe 630 and a second end pivotally connected at pivot axis 649 to float arm 224. In the example illustrated, pivot axis 649 is located in a forward end of float arm 224 adjacent cutter assembly 226. Rear linkage 648 has a first portion 652 pivotally connected at pivot axis 653 to a rear portion of skid shoe 630, a second portion 654 pivotally connected to float arm 224 at a pivot axis 655. Linkages 646 and 648 extend rearwardly with respect to float arm 224 such that skid shoe 630 moves rearwardly and upwardly when skid shoe 630 is being retracted into a position closer to float arm 224.

Powered actuator 634 comprises an actuator that, in response to signals from controller 237 (shown in FIG. 6) selectively moves or drives linkage assembly 632 to selectively extend and retract skid shoe 630 relative to float arm 224. In the example illustrated, powered actuator 634 comprises a cylinder-piston assembly, such as a hydraulic cylinder-piston assembly, wherein a first end of the cylinder-piston assembly is pivotably connected to float arm 224 and a second end of the cylinder-piston assembly is pivotally connected to a midportion 651 of linkage 648. Extension or retraction of the cylinder-piston assembly forming actuator 634 pivots linkages 646, 648 to extend or retract skid shoe 630. In other implementations, powered actuator 634 may comprise other actuators that are driven under power from a hydraulic pressure source such as a driven pump, a motor driven with electrical current, an electric solenoid, or a transmission driven by an internal combustion engine.

Figure 11:
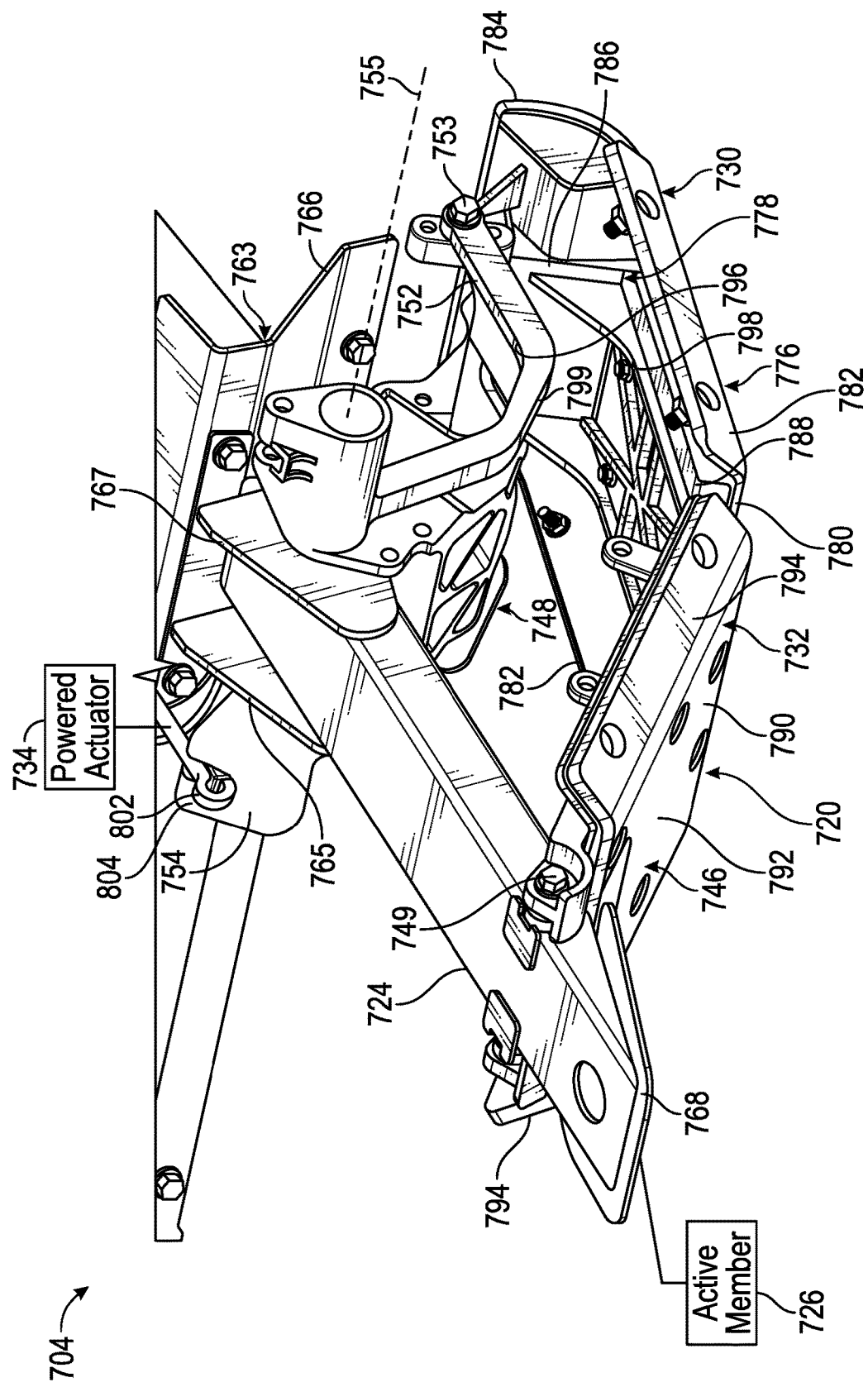
FIG. 11 is a front perspective view of an example float arm support system for use in the example harvester of FIG. 4.

FIG. 11 is a diagram schematically illustrating portions of an example harvester head 704. Harvester head 704 may be utilized as part of harvester 200 in place of harvester head 204. Harvester head 704 is similar to harvester head 204 except that harvester head 704 comprises float arm support system 720 in place of float arm support system 220. Those remaining components of head 704 which correspond to components of head 204 are numbered similarly or are shown in FIGS. 4-5. For example, as with harvester heads 304, 404, 504 and 604 described above, harvester head 704 may additionally comprise main frame 208, center feed section 210, platform wings 212 and gathering reels 214 as illustrated in FIGS. 4-6 and described above.

Float arm support system 720 comprises float arm 724, an active member 726 (schematically shown in FIG. 11), skid shoe 730, linkage assembly 732 and powered actuator 734.

Float arm 724 is similar to float arm 224 described above except that float arm 724 is specifically illustrated as being fixedly mounted or secured to the framework 763 of the respective wing 212 (shown and described above with respect to FIGS. 4-6) of head 704. In the example illustrated, framework 763 comprises a bracket 765 and a rigidifying downwardly projecting structural support member 766.

Bracket 765 forms a channel 767 which receives a rear end of float arm 724. In the example illustrated, the rear end of float arm 724 is pinned, welded or fixed to bracket 765. In some implementations, float arm 724 may be pivotally secured to bracket 765. In some implementations, bracket 765 may be omitted.

Support structure 766 extends partially along the length of the respective section 212 of head 704 and structurally strengthens section 212. Support structure 766 is shown in FIG. 5. Support structure 766 projects downwardly below bracket 765 at the rear end of float arm 724. In some implementations, support structure 766 may be omitted.

Float arm 724 has a forward end 768 which is coupled to and carries an active member 726. Active member 726 comprises a member or mechanism that interacts with plants or other objects extending from or above the underlying terrain. During use the system harvester 200 with head 704, active member 726 may be supported at various heights relative to the underlying terrain, depending upon characteristics of the crop being harvested or otherwise interacted upon.

Figure 12:
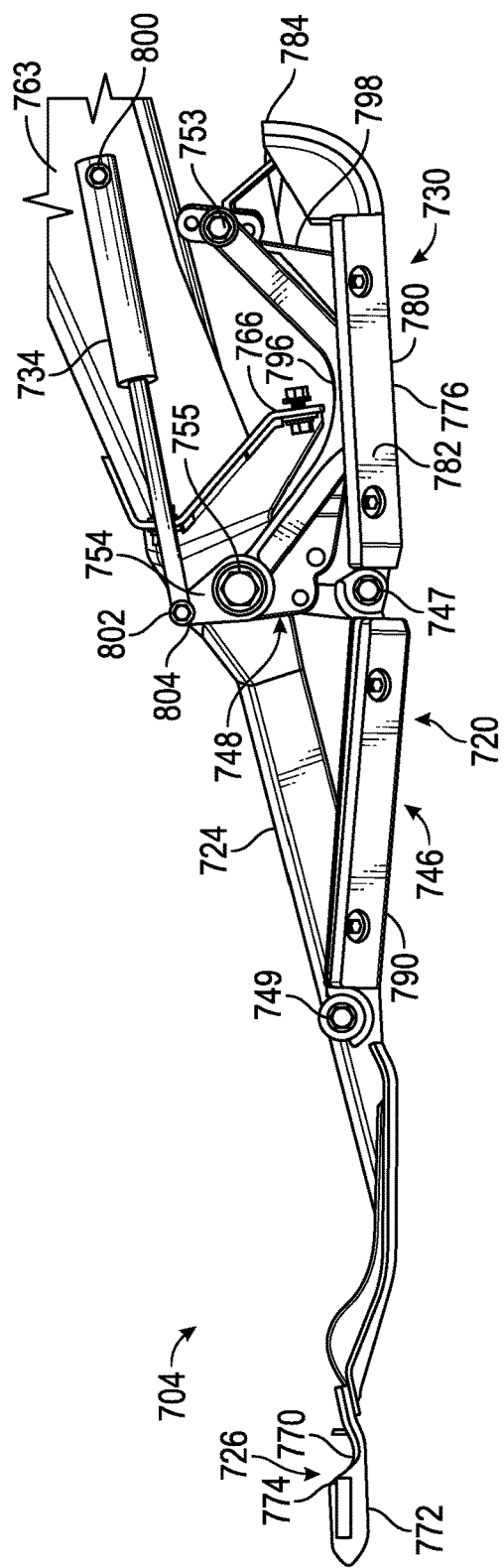
FIG. 12 is a side view of the example float arm support system of FIG. 11 in a fully retracted position.
Figure 13:
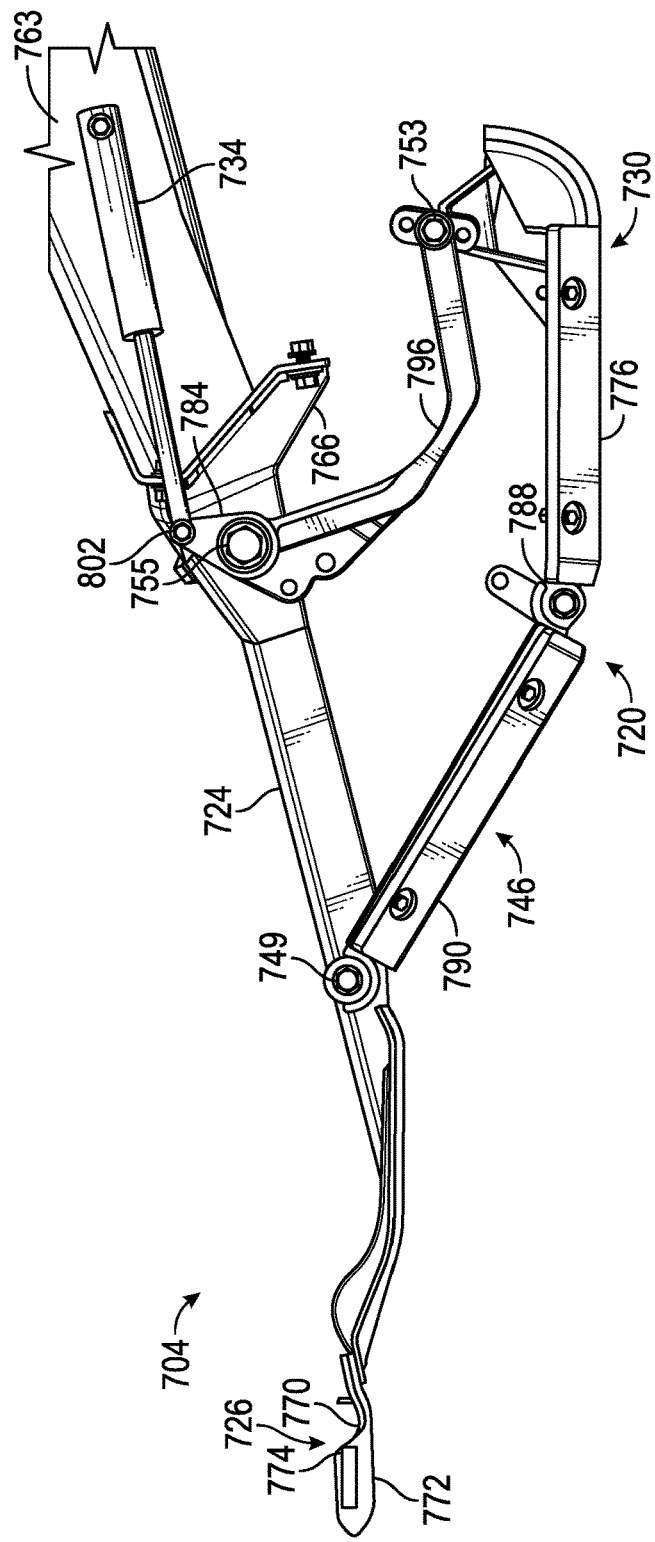
FIG. 13 is a side view of the example float arm support system of FIG. 11 in a mid-retracted/extended position.
Figure 14:
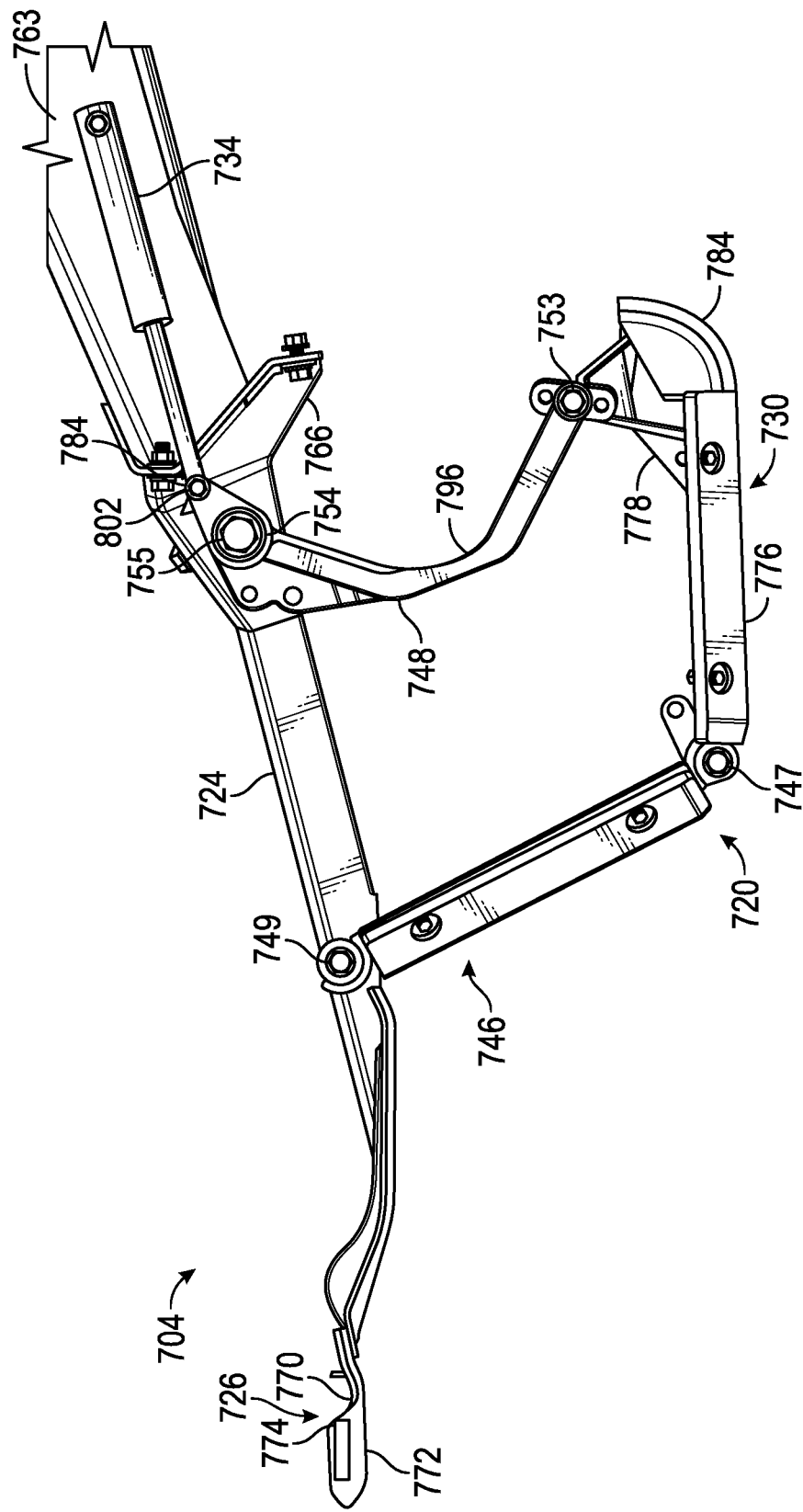
FIG. 14 is a side view of the example float arm support system of FIG. 11 in a fully extended position.

In one implementation, active member 726 comprises cutter assembly similar to cutter assembly 226 described above. FIGS. 12-14 illustrate head 704, wherein active member 726 comprises a cutter assembly having a cutter bar 770 supporting a guide or guard 772 which slidably receives a reciprocatable knife 774. In other implementations, active member 726 may have other configurations.

Skid shoe 730 is similar to skid shoe 30 or skid shoe 230 described above except that skid shoe 630 is specifically illustrated as comprising plate 776 and skid shoe support bracket 778. Plate 776 provides those surfaces or faces that contact the underlying terrain. In the example illustrated, plate 776 comprises a bottom plate portion 780, side plate portions 782 and rearward plate portion 784. Portions 782 and 784 extend upwardly or upturned from bottom plate portion 780. Portion 782 and 784 provide a smooth lower transition surface along the sides and rear of skid shoe 730 for sliding along the ground when the positioning of skid shoe 730 is being adjusted by powered actuator 734 and for riding up on any bumps or down any concavities in the topography of the underlying terrain.

Skid shoes support bracket 778 comprises a bracket structure mounted to bottom plate portion 780. Bracket 778 comprises a rear upstanding portion 786 and a forward portion 788 which are pivotably pinned or otherwise pivotably coupled to linkage assembly 732. Although illustrated as being mounted to plate 776, in other implementations, bracket 778 may be integrally formed as part of a single unitary body with plate 776.

Linkage assembly 732 operably couples skid shoe 730 to float arm 724. Linkage assembly 732 comprises front linkage 746 and rear linkage 748. Linkages 746 and 748 extend rearwardly with respect to float arm 724 such that as skid shoe 730 is moved rearwardly and upwardly when skid shoe 730 is being retracted into a position closer to float arm 724.

Front linkage 746 has a first end pivotally connected at pivot axis 747 (shown in FIG. 12) to a forward portion of skid shoe 630 and a second end pivotally connected at pivot axis 749 to float arm 224. In the example illustrated, pivot axis 747 is provided at a junction of linkage 746 and a forward portion of support bracket 778 of skid shoe 730. In the example illustrated, pivot axis 649 is located at a forward end of float arm 224. Adjacent to cutter assembly 226.

In the example illustrated, front linkage 746 comprises a lower plate 790 that forms a second skid shoe. Plate 790 comprises a bottom plate portion 792 and two opposite side portions 794 which are upturned from bottom plate portion 792. Portions 794 provide ramp surfaces for encountering changes in the underlying terrain. As shown by FIG. 12, pivot point 747 is arranged such that the bottom plate portions 780 and 792 of plates 776 and 790, respectively, forming the two skid shoes, extend substantially coplanar (being angled no greater than 10% from one another) when powered actuator 734 has retracted skid shoes 730 to a fully retracted position, positioning active member 726 in close proximity to the underlying terrain.

Rear linkage 748 has a first portion 752 pivotally connected at pivot axis 753 to a rear portion 786 of bracket 778 of skid shoes 730. Rear linkage 748 further comprises a second portion 754 pivotally connected to bracket 765 and/or float arm 724 for movement about a pivot axis 755. In the example illustrated, rear linkage 748 is boomerang or V-shaped within upwardly facing bend or concavity 796 that receives structural support 766 when skid shoes 730 is in a fully retracted position respect to float arm 724 as shown in FIG. 12. As a result, skid shoe 730 may be retracted into closer proximity with float arm 724 and framework 763 so as to support active member 726 in closer proximity with the underlying terrain.

In the example illustrated, rear linkage 748 and bracket 778 of skid shoe 730 further nest within one another when skid shoes 730 is in the fully retracted position as shown in FIG. 12. As a result, skid shoe 730 may be retracted into closer proximity with float arm 724 and framework 763 so as to support active member 726 in closer proximity with the underlying terrain. In the example illustrated, rear linkage 748 has an underside with cavities 797 that receive operably projecting ribs 798 of bracket 778. In other implementations, portions of the underside of rear linkage 748 may alternatively nest within and upwardly facing cavity provided in bracket 778.

Powered actuator 734 comprises an actuator that, in response to signals from controller 237 (shown in FIG. 6), selectively moves or drives linkage assembly 732 to selectively extend and retract skid shoe 730 relative to float arm 724 and to maintain skid shoe 730 and a selected position, supporting and maintaining active member 726 at a selected height above the underlying terrain. In the example illustrated, powered actuator 734 comprises a cylinder-piston assembly, such as a hydraulic cylinder-piston assembly, wherein a first end 800 of the cylinder-piston assembly is pivotably connected to framework 763 (shown in FIG. 12) and a second end 802 of the cylinder-piston assembly is pivotally connected to a lever arm portion 804 of rear linkage 748. Extension or retraction of the cylinder-piston assembly forming actuator 734 pivots linkages 746, 748 to extend or retract skid shoe 730 between a continuum of various positions, examples of which are shown in FIGS. 12-14. In other implementations, powered actuator 734 may comprise other actuators that are driven under power from a hydraulic pressure source such as a driven pump, a motor driven with electrical current, an electric solenoid, or a transmission driven by an internal combustion engine.

FIGS. 12-14 illustrate varies example positions at which active member 726 may be positioned and supported by powered actuator 734 and skid shoes 730. FIG. 12 illustrates powered actuator 734 positioning skid shoe 730 in a fully retracted position. In the fully retracted position, plates 776 and 790 extend substantially coplanar. In addition, concavity 796 receives structural support 766 while bracket 778 of skid shoe 730 is nested within an underside of rear linkage 748.

FIG. 13 illustrates powered actuator 734 positioning skid shoe 730 at a mid-extended position. FIG. 14 illustrates powered actuator 734 positioning skid shoe 730 at an example fully extended position. In the position shown in FIGS. 13 and 14, plates 790 of linkage 746 project upwardly from pivot point 747, substantially out of contact with the underlying terrain bearing against bottom plate portion 780.

As head 704 is moved across a field, skid shoes 730 contacts the underlying terrain and supports active member 726 at the preselected height or spacing above the underlying terrain. In response to encountering drops or bumps in the underlying terrain, float arm 724 pivots about the axis 207 (shown in FIG. 6) and the respective axis 240 of the section 212 supported by float arm 724 and its respective skid shoes 730. As with each of the described float arm support systems, float arm support system 720 automatically and directly translates changes in the topography of the surface of the underlying terrain to changes in positioning of float arm 724 and active member 726 to provide enhanced height control or ground following. Such height control or ground following may be remotely adjusted through the transmission of control signals to powered actuator 734.

In one implementation, each of float arms 724 and its associated skid shoe 730 (replacing each of skid shoes 230 shown in FIG. 5) is individually moved between a fully extended position and a fully retracted position by a dedicated powered actuator 734. In other implementations, float arms 724 and their skid shoes 730 may share use of a powered actuator to move the multiple float arms 724 and their skid shoes 730 between the fully extended and fully retracted positions. For example, in some implementations, multiple float arms 724 may be mechanically linked to one another and to a single powered actuator 734. In some implementations, multiple rear linkages 748 may be mechanically linked for concurrent pivoting about axis 755 in response to torque provided by a single powered actuator 734. In one implementation, a first powered actuator may drive and maintain the positioning of each of the skid shoes 730 on a first one of the sections 212 and a second power actuator 734 may drive and maintain the positioning of each of the skid shoes 730 on a second one of sections 212. In other implementations, each section 212 may utilize multiple powered actuators 734 which are shared amongst all or multiple subsets of skid shoes 730.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A float arm support system comprising:
a float arm supporting an active member, the float arm being pivotable about a first axis;
a skid shoe to bear against and follow local ground contours of the underlying terrain while supporting the active member of the float arm above the underlying terrain, the skid shoe being coupled to the float arm between the first axis and the active member;
a powered actuator operably coupled to the skid shoe to vertically move the skid shoe to adjust a spacing at which the skid shoe supports the active member of the float arm relative to the underlying terrain;
a frame pivotably supporting the float arm for rotation about the first axis;
a first linkage having a first portion pivotably connected to the skid shoe and a second portion pivotably connected to the float arm about a; and
a second linkage having a first portion pivotably connected to the skid shoe, a second portion pivotably connected to the powered actuator and a third portion pivotably connected to one of the float arm and the frame, wherein the first portion of the first linkage is pivotably connected to the skid shoe for pivotal movement about a second axis different than the first axis, wherein the second portion of the first linkage is pivotably connected to the float arm for pivotal movement about a third axis different than the second axis and different than the first axis, the third axis being forward the second axis between the second axis and the active member, wherein the first linkage forms a second skid shoe and wherein the skid shoe and the second skid shoe are movable to a retracted position in which the skid shoe and the second skid shoe are substantially coplanar.

2. The float arm support system of claim 1, wherein the active member comprises a cutter bar and a reciprocatively supported knife and wherein the powered actuator is operably coupled to the skid shoe so as to vertically adjust a spacing between the skid shoe and the cutter bar.

3. The float arm support system of claim 2, wherein the skid shoe is pivotable in a concurrently upward and forward direction towards the cutter bar to move the skid shoe to a position closer to the cutter bar.

4. The float arm support system of claim 3, wherein the cutter bar remains parallel to the underlying terrain when the skid shoe is pivoting in the concurrently upward and forward direction.

5. The float arm support system of claim 1, wherein the third portion is between the first portion and the second portion.

6. The float arm support system of claim 1, wherein the skid shoe and the second skid shoe each comprise a plate having a face to bear against and follow local ground contours of the underlying terrain.

7. The float arm support system of claim 1, wherein the float arm comprises a downwardly projecting structural support member and wherein the second linkage is V-shaped, the second linkage receiving the downwardly projecting structural support member in response to the skid shoe being retracted.

8. The float arm support system of claim 7, wherein the skid shoe comprises a support bracket and wherein the second linkage and the support bracket nest in response to the skid shoe being retracted.

9. The float arm support system of claim 1, wherein the powered actuator comprises a cylinder-piston assembly having a first portion pivotably connected to the sec is formed and linkage and a second portion pivotably connected to the float arm between the first axis and the active member.

10. The float arm support system of claim 1, wherein the third portion is pivotably connected to the float arm.

11. The float arm support system of claim 1, wherein the third portion is pivotably connected to the frame.

12. The float arm support system of claim 1 further comprising a scissor jack pivotably coupling the skid shoe to the frame, wherein the powered actuator selectively raises and lowers the scissor jack to adjust a spacing at which the skid shoe supports the cutter bar relative to the underlying terrain.

13. The float arm support system of claim 1, wherein the float arm projects in a direction forward the first axis and forward of the skid shoe and wherein the float arm is connected to the active member forwardly beyond and spaced from the skid shoe.

14. A method comprising:
movably supporting a float arm carrying an active member about a first axis; and
increasing a spacing between the float arm and the active member relative to underlying terrain by vertically lowering a skid shoe carried by the float arm with a powered actuator, wherein the skid shoe is connected to the float arm by a first linkage pivotably connected between the float arm and the skid shoe and a second linkage pivotably connected between the float arm and the skid shoe and wherein the vertical lowering of the skid shoe is by the powered actuator directly connected to the second linkage to pivot the second linkage.

15. A harvester head comprising:
a support assembly pivotably supported about a first axis and supporting a cutter bar and a reciprocatively supported knife;
a skid shoe to bear against and follow local ground contours of the underlying terrain while supporting the cutter bar above the underlying terrain, the skid shoe being pivotable about a second axis parallel to the first axis between the first axis and the cutter bar; and
a powered actuator operably coupled to the skid shoe to selectively pivot the skid shoe about the second axis so as to vertically adjust a spacing between the skid shoe and the cutter bar to adjust a spacing at which the skid shoe supports the cutter bar relative to the underlying terrain, wherein the skid shoe is coupled to the support assembly by:

a first linkage having a first portion pivotably connected to the skid shoe and a second portion pivotally connected to the support assembly; and a second linkage having a first portion pivotably connected to the skid shoe, a second portion pivotably connected to the powered actuator and a third portion pivotally connected to the support assembly.

\* \* \* \* \*